United States Patent [19]

Nozawa et al.

[11] Patent Number: 4,591,990

[45] Date of Patent: May 27, 1986

[54] SPINDLE ROTATIONAL FREQUENCY CHECKING METHOD

[75] Inventors: Ryoichiro Nozawa, Tokyo; Nobuyuki Kiya, Hachioji, both of Japan

[73] Assignee: Fanuc Ltd., Minamitsuru, Japan

[21] Appl. No.: 761,671

[22] PCT Filed: May 14, 1982

[86] PCT No.: PCT/JP82/00169

§ 371 Date: Dec. 20, 1982

§ 102(e) Date: Dec. 20, 1982

[87] PCT Pub. No.: WO82/04005

PCT Pub. Date: Nov. 25, 1982

Related U.S. Application Data

[63] Continuation of Ser. No. 456,008, Dec. 20, 1982, abandoned.

[30] Foreign Application Priority Data

May 14, 1981 [JP] Japan .................. 56-072832

[51] Int. Cl.⁴ .................. G05B 23/00; G06F 15/46
[52] U.S. Cl. .................. 364/474; 318/565; 364/551; 364/565
[58] Field of Search ........... 364/174, 474, 475, 565, 364/550, 551; 318/563, 565; 192/0.033, 3.31; 303/95, 96, 109

[56] References Cited

U.S. PATENT DOCUMENTS

| | | | |
|---|---|---|---|
| 3,578,871 | 5/1971 | Sakamoto | 415/10 |
| 4,033,202 | 7/1977 | Ahlen et al. | 192/3.31 |
| 4,076,999 | 2/1978 | Edwards et al. | 318/465 |
| 4,078,750 | 3/1978 | Tomlinson | 244/194 |
| 4,157,850 | 6/1979 | Marouby | 303/109 |
| 4,267,458 | 5/1981 | Uram et al. | 364/900 |
| 4,345,192 | 8/1982 | Kohzai et al. | 318/592 |
| 4,350,941 | 9/1982 | McClure et al. | 318/603 |
| 4,384,330 | 5/1983 | Matsuda et al. | 364/426 |
| 4,386,306 | 5/1983 | Nishimura et al. | 318/571 |

FOREIGN PATENT DOCUMENTS 55-41249 3/1980 Japan .

Primary Examiner—Joseph Ruggiero
Attorney, Agent, or Firm—Staas & Halsey

[57] ABSTRACT

A method of checking the rotational frequency of a spindle in a numerically controlled machine tool for rotating the spindle on the basis of a spindle rotational frequency command issued by a numerical control device. An alarm signal is issued when a fluctuation in the actual rotational velocity (AVC) of the spindle falls outside limits ($TRV_1$) decided by a predetermined allowable percentage of velocity change, or when the actual rotational velocity (AVC) does not attain predetermined velocity limits ($TRV_2$) even after the passage of a predetermined time period (P) following a change in commanded velocity.

5 Claims, 3 Drawing Figures

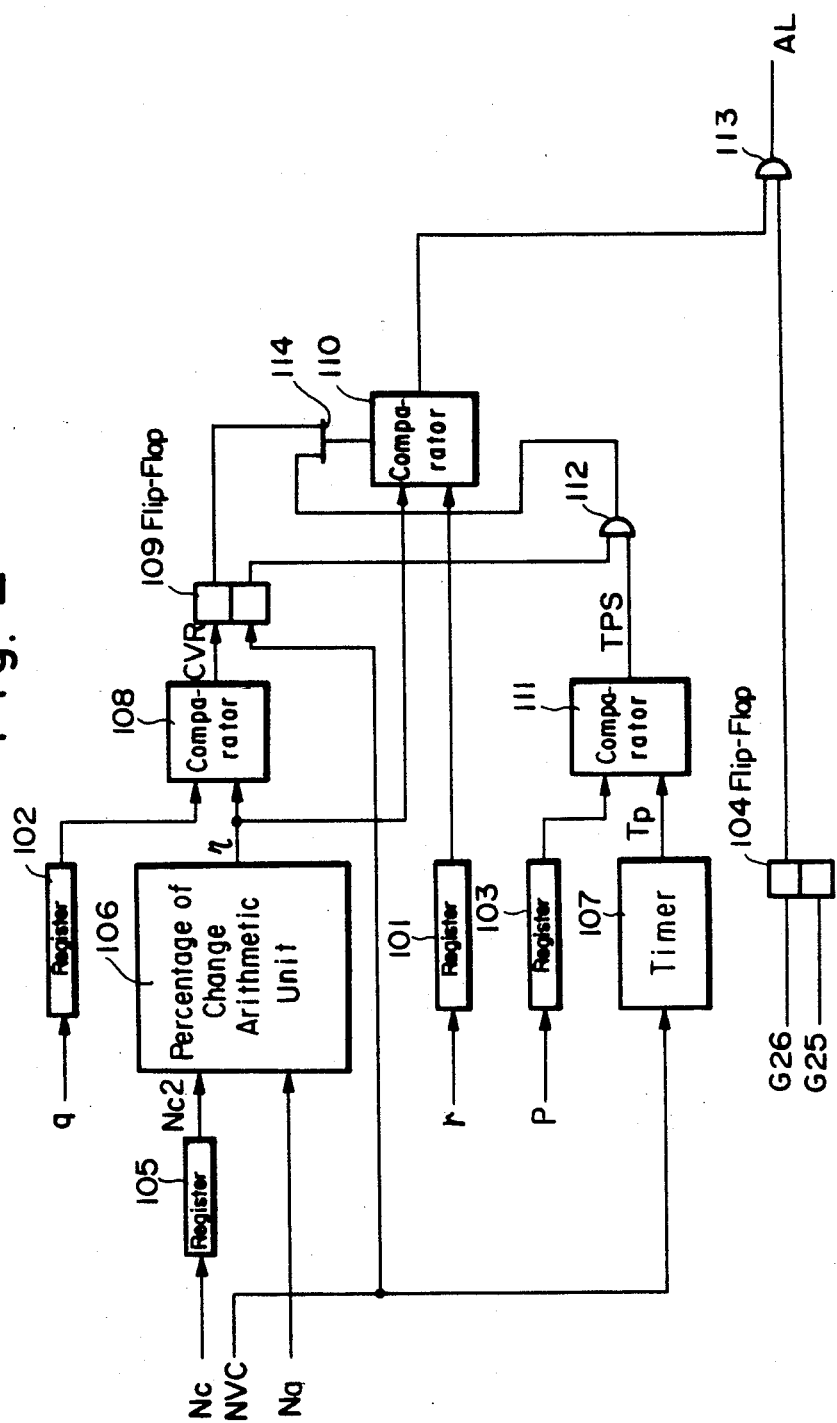

1

SPINDLE ROTATIONAL FREQUENCY CHECKING METHOD

This is a continuation of co-pending application Ser. No. 456,008 filed on Dec. 20, 1982, abandoned.

BACKGROUND OF THE INVENTION

This invention relates to a method of checking the rotational frequency of a spindle in a numerically controlled machine tool.

In such machining operations as turning, tapping and drilling, a spindle is rotated at a speed in accordance with a rotational frequency command from a numerical control device (referred to as an NC), whereby a workpiece or tool is caused to rotate.

In a lathe, for example, a spindle is rotated on the basis of an S-function instruction (a spindle rotational frequency instruction issued in the form of the letter of the alphabet S followed by a two-digit numerical value) from an NC, whereby a workpiece loaded on the spindle via a chuck is caused to rotate. While the workpiece is rotating, a cutter is transported in the direction of the central axis of the workpiece (the Z-direction) and in a direction orthogonal thereto (the X-direction) to subject the workpiece to a predetermined turning or thread cutting operation. In thread cutting work, threads cannot be cut at a precise pitch unless the spindle is rotated at the commanded velocity. Even in an ordinary turning operation, moreover, tool life is shortened unless the spindle is rotated at a commanded velocity, namely at the commanded rotational frequency.

In performing tapping machining by a machining center or the like, a screw tap mounted on a spindle is rotated in accordance with a commanded rotational velocity while the screw tap is transported in synchronism with the rotational velocity to cut threads in a workpiece. Accurate thread cutting cannot be carried out unless the screw tap is rotated at the commanded velocity.

From the foregoing, it can be seen that there is a need to rotate the spindle at the commanded rotational velocity at all times, or to rotate the spindle within an allowable percentage of change. If the allowable percentage of change is exceeded, then this must be sensed quickly and the problem eliminated. In the prior art, however, an effective method of checking the rotational frequency of a spindle is not available.

Accordingly, an object of the present invention is to provide a novel method of checking the rotational frequency of a spindle wherein, when the spindle rotational frequency is checked and found to exceed the allowable percentage of change, or when the actual rotational velocity does not attain a predetermined velocity even after the passage of a prescribed length of time following a change in commanded velocity, these phenomena are regarded as being abnormalities in response to which an alarm signal is produced.

SUMMARY OF THE INVENTION

In a machine tool for performing such machining as turning, tapping or drilling, the present invention provides a novel method of checking the rotational frequency of a spindle wherein an alarm is produced when the spindle rotational frequency is checked and found to exceed an allowable percentage of change, or when the actual rotational velocity does not attain a predetermined velocity even after the passage of a prescribed length of time following a change in commanded velocity. By employing this checking method, machining will not continue on the basis of an abnormal spindle rotational frequency, so that a higher accuracy can be obtained for machining performed by a variety of machine tools.

BRIEF DESCRIPTION OF THE DRAWINGS

FIG. 2 is a block diagram of an embodiment of a system for performing the method of the present invention.

DESCRIPTION OF THE PREFERRED EMBODIMENT

The present invention will now be described in detail with reference to the drawings.

Figure 1A:
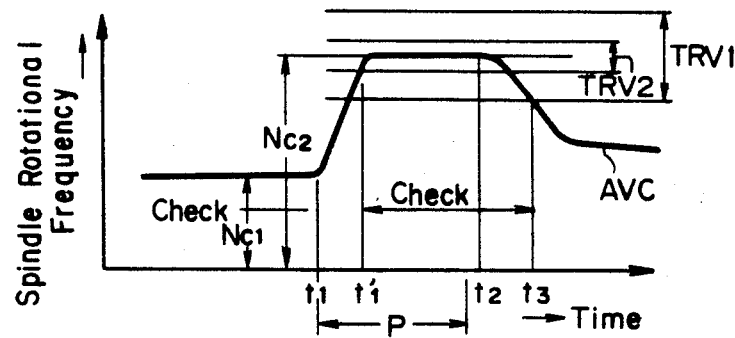
FIG. 1(a) and FIG. 1(b) are graphs for explaining a method of checking the rotational frequency of a spindle according to the present invention.
Figure 1B:
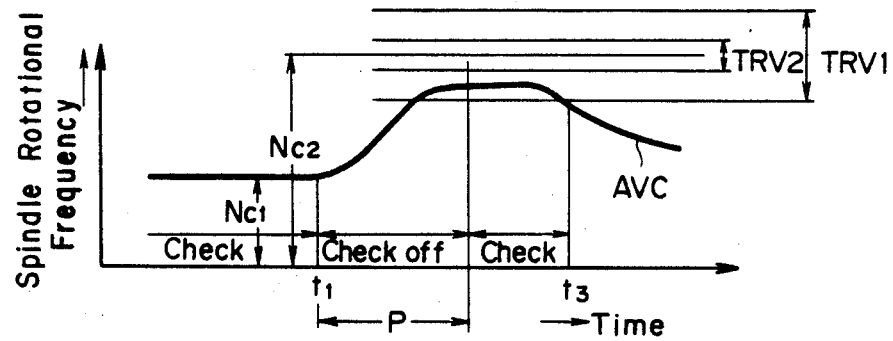

FIG. 1(a), FIG. 1(b) and FIG. 2 are diagrams for explaining a method of checking the rotational frequency of a spindle according to the present invention.

In the Figures, AVC represents an actual velocity curve, $Nc_1$ an initial commanded rotational velocity, $Nc_2$ a commanded rotational velocity issued at a time $t_1$, $TRV_1$ a zone of maximum allowable velocity change based on an already given maximum allowable percentage of velocity change q, and $TRV_2$ a commanded velocity zone wherein actual rotational velocity is regarded to have attained a commanded velocity. This commanded velocity zone is decided based on a percentage of velocity change r that determines whether a commanded rotational frequency has been reached. The character p represents an already given maximum allowable time period. If the actual rotational velocity does not reach the commanded velocity zone $TRV_2$ within this allowable time period following a change in the commanded velocity, then the rotational frequency of the spindle begins to be checked using the zone $TRV_1$ of maximum allowable speed change. Thus, in FIG. 1(a), let us assume that the commanded rotational velocity $Nc_1$ is changed to $Nc_2$ at time $t_1$. The actual rotational velocity attains the commanded rotational velocity $Nc_2$ after a predetermined period of time corresponding to the delay of the servo system, after which rotation continues at the commanded rotational velocity $Nc_2$. Now, however, let us assume that there is a decline in the actual rotational velocity at time $t_2$ because of a servo system malfunction or some other cause, and that the zone TRV1 of maximum allowable velocity change is exceeded at time $t_3$. In such case, in accordance with the invention, the event is sensed and an alarm signal is produced immediately.

In FIG. 1(b), let us assume that the commanded rotational velocity is changed from $Nc_1$ to $Nc_2$ at time $t_1$. If the servo system is operating normally, the actual rotational velocity will reach the commanded rotational velocity $Nc_2$ after a predetermined period of time. If the servo system develops an abnormality, however, the actual rotational velocity will not reach the commanded velocity zone $TRV_2$ even after the passage of time p. In such case, according to the invention, the rotational frequency of the spindle begins to be checked on the basis of the zone $TVR_1$ of maximum allowable velocity change, immediately after the passage of time p.

FIG. 2 is a block diagram of an embodiment according to the present invention. In FIG. 2, numeral 101 denotes a register for storing a maximum allowable percentage of velocity change r, 102 a register for storing a percentage of velocity change q which determines whether a commanded rotational frequency has been reached, and 103 a register for storing maximum allowable time p. These quantities p, q, r, along with a G-function instruction G26, indicative of the check mode, are inserted in an NC command program on an NC command tape or the like in the following format:

G26 P□□...□Q△△...△R○○...○*

They are read out and set in the registers 101 through 103. It should be noted that the G-function instruction G26 indicative of the check mode is a modal, and that the rotational frequency of the spindle is being checked at all times barring the arrival of a command representing a G-function instruction:

G25* that is indicative of a CHECK OFF mode. Further, p, q and r can be stored beforehand, along with various parameters, in a bubble memory or the like so as to be preserved even if the NC power supply goes down. If p, q and r are stored previously in a bubble memory in the form of parameters, then it will suffice to issue merely the following command, namely:

G26* as the NC command for the check mode.

Numeral 104 denotes a flip-flop, (referred to as an FF) for memorizing the check mode, which is set by G26 and reset by G25. Numeral 105 denotes a register for storing a commanded rotational frequency $N_c$, and 106 denotes a percentage of change arithmetic unit. The arithmetic unit 106 receives, as input signals, the commanded rotational frequency $N_c$ and the actual rotational velocity $N_a$, and performs the following arithmetic operation to compute the percentage of velocity change $\eta$:

$$\eta = (N_c - N_a) \times 100/N_c (\%) \quad (1)$$

It should be noted that a pulse coder such as a position coder is mounted on the spindle for generating a pulse each time the spindle rotates by a predetermined amount. The actual rotational velocity $N_a$ is found by counting the pulses generated over a predetermined time period followed by reading the counted value. It should also be noted that the actual rotational velocity is fed back to the NC for controlling spindle rotation. Numeral 107 designates a timer which, following a newly commanded rotational velocity (new velocity command signal NVC="1"), measures elapsed time. Numeral 108 denotes a comparator for comparing, in terms of magnitude, the percentage of velocity change $\eta$ and the preset percentage of velocity change q. When $\eta < q$ is true, namely when the actual rotational velocity $N_a$ falls within the commanded velocity zone $TRV_2$ (FIG. 1(a)), the comparator 108 produces a commanded velocity arrival signal CVR (="1"). Numeral 109 denotes a flip-flop (referred to as an FF) which is set by the commanded velocity arrival signal CVR (="1") and reset by the new velocity command signal NVC which goes to logical "1" when a new rotational velocity is commanded. Numeral 110 denotes a comparator for comparing, in terms of magnitude, the percentage of velocity change $\eta$ and the maximum allowable percentage of velocity change r after the actual rotational velocity $N_a$ has reached commanded velocity zone $TRV_2$. When $\eta > r$ is true, namely when the actual rotational velocity $N_a$ exceeds the zone $TRV_1$ of maximum allowable velocity change, the comparator 110 produces logical "1". Numeral 111 designates a comparator for comparing, in terms of magnitude, elapsed time $T_p$ and maximum allowable time P (FIG. 1(b)) after the new velocity command signals NVC goes to logical "1". When $T_p < P$ is true, the comparator 111 produces a time-over signal TPS of logic level "1". Numerals 112 and 113 denote AND gates, and 114 an OR gate.

The operation of FIG. 2 will now be described with reference to FIGS. 1(a) and 1(b). Assume that the commanded rotational velocity is changed from $Nc_1$ to $Nc_2$ at time $t_1$ (FIG. 1(a), FIG. 1(b)). Owing to the change in the velocity command, the new rotational velocity $Nc_2$ is set in the register 105 in place of the old rotational velocity $Nc_1$, and the new speed command signal NVC goes to logical "1" to reset the flip-flop 109 and to start the timer 107. Meanwhile, the percentage of change arithmetic unit 106 is constantly executing the operation of Eq. (1), the result of which operation, namely $\eta$, is delivered to the comparator 108. The latter compares the magnitude of this percentage of velocity change $\eta$ with the magnitude of the given percentage of velocity change q. If the motor is rotating normally and the relation $\eta \leq q$ is true at time $t_1'$, then the comparator 108 produces the commanded velocity arrival signal CVR (="1") and FF 109 is set. When FF 109 is set, the comparator 110 thenceforth compares, in magnitude, the percentage of velocity change $\eta$, which is the output of the arithmetic unit 106, and the maximum allowable percentage of velocity change r which is preset in the register 101. Specifically, the comparator 110 discriminates whether the actual rotational velocity $N_a$ falls outside the zone $TRV_1$ of maximum allowable velocity change (FIG. 1(a)) because of the servo system or some other cause. In the event that an abnormality develops in the servo system and the actual rotational velocity declines at time $t_2$ so that the relation $\eta \geq r$ comes into effect at time $t_3$, the comparator 110 produces logical "1", whereby an alarm signal is delivered via the AND gate 113. Note that FF 104 is assumed to have been set by G26.

The foregoing is for a case where an abnormality develops in, e.g., the servo system after the actual rotational velocity Na reaches the commanded velocity zone $TRV_2$. There are also instances where an abnormality develops in the servo system before the commanded velocity zone $TRV_2$ is reached, with the actual rotational velocity $N_a$ not attaining the zone $TRV_2$ even after the passage of a predetermined time period. When such is the case, the comparator 111 produces the time-over signal TPS, whereby a signal is fed into the comparator 110 through the AND gate 112 and OR gate 114, before the flip-flop 109 is set. As a result, the comparator 110 compares the percentage of velocity change $\eta$ and the maximum allowable percentage of velocity change r. Since $\eta > r$ at this time, the AND gate 113 delivers the alarm signal AL immediately.

It should be noted that the alarm signal is delivered to the machine tool side immediately, and that the NC comes to an alarm stop.

Thus, according to the present invention, an alarm signal is issued, indicative of an abnormality in a servo system or elsewhere, when a fluctuation in the rotational frequency of the spindle falls outside a maximum allowable velocity range decided by a maximum allowable percentage of velocity change, or when the rotational frequency of the spindle does not attain the vicinity of a commanded velocity even after the passage of a predetermined period of time following a change in commanded velocity. Accordingly, an abnormality in the spindle servo system or spindle mechanism can be checked without machining being continued at the abnormal rotational frequency. Thus, by way of example, problems caused by seizure of a guide bush in the machining of bar stock can be checked rapidly.

Furthermore, according to the present invention, two quantities are set, namely maximum allowable percentage of change for judging malfunctions, and percentage of change for judging whether the commanded speed has been reached. An alarm therefore will not be issued erroneously during the time that the actual rotational frequency is approaching the commanded rotational frequency. Even when the commanded rotational velocity is attained while the actual rotational frequency fluctuates somewhat, (but without any monotonic increase or decrease), the alarm will not issue.

Also, according to the invention, the timing at which checking starts and stops is decided automatically by the NC. The rotational frequency of the spindle can therefore be checked not only when a rotational frequency is commanded by the program, but also when the rotational frequency is changed automatically, internally of the NC, to perform a turning machining operation, for example, when machining is carried out in a mode for constant peripheral speed control.

We claim:

1. A method of checking the rotational frequency of a spindle, having an actual rotational velocity, in a numerically controlled machine tool for rotating the spindle on the basis of a commanded spindle rotational velocity issued by a numerical control device, a maximum allowable time for reaching the commanded spindle rotational velocity being predetermined, said method comprising the steps of:
   (a) computing a first percentage of velocity change using the commanded rotational velocity of the spindle and the actual rotational velocity of the spindle;
   (b) determining a zone of maximum allowable velocity change and a zone of commanded velocity;
   (c) discriminating whether the first percentage of velocity change is within the zone of maximum allowable velocity change when the zone of commanded velocity is reached;
   (d) comparing the difference between an actual elapsed time and the maximum allowable time when the zone of commanded velocity is not reached; and
   (e) issuing an alarm signal when the first percentage of velocity change is not within the zone of maximum allowable velocity change.

2. A method of checking the rotational frequency of a spindle having a predetermined second percentage of velocity change, according to claim 1, wherein said step (e) comprises the substeps of:
   (i) determining a percentage of change in the actual rotational velocity;
   (ii) discriminating whether the percentage of change in the actual rotational velocity is less than the zone of maximum allowable velocity change and below the predetermined second percentage of velocity change when the commanded rotational velocity of the spindle is changed; and
   (iii) checking whether the percentage of change in the actual rotational velocity exceeds the zone of maximum allowable velocity change when the percentage of change in the actual rotational velocity is below the predetermined second percentage of velocity change.

3. A method of checking the rotational frequency of a spindle according to claim 2, wherein said step (e) further comprises the substeps of:
   (iv) discriminating whether the percentage of change in the actual rotational velocity is less than the zone of maximum allowable velocity change and is within velocity limits of the predetermined second percentage of velocity change within a predetermined time period after the commanded spindle rotational velocity is changed; and
   (v) checking whether the percentage of change in the actual rotational velocity exceeds the zone of maximum allowable velocity change when the percentage of change in the actual rotational velocity is not within the velocity limits of the predetermined second percentage of velocity change.

4. A method of checking the rotational frequency of a spindle, including a numerical control device having a numerical control program, according to claim 3, further comprising the step of inserting three values into the numerical control program, and applying the three values to the numerical control device as commands, the three values determined by the allowable percentage of velocity change, the second percentage of velocity change and the time period following a change in the commanded rotational velocity of the spindle.

5. A method of checking the rotational frequency of a spindle having a predetermined second percentage of velocity change according to claim 1, wherein said step (e) comprises the substeps of:
   (i) discriminating whether the actual rotational velocity is smaller than the allowable percentage of velocity change and is within the zone of maximum allowable velocity change determined by the predetermined second percentage of velocity change within the maximum allowable time after the rotational velocity of the spindle is changed; and
   (ii) checking whether the limits decided by the allowable percentage of velocity change are exceeded when the actual rotational velocity is not within the zone of maximum allowable velocity change determined by the predetermined second percentage of velocity change.

* * * * *

UNITED STATES PATENT AND TRADEMARK OFFICE
CERTIFICATE OF CORRECTION

PATENT NO.   :  4,591,990
DATED        :  MAY 27, 1986
INVENTOR(S)  :  RYOICHIRO NOZAWA ET AL.

It is certified that error appears in the above-identified patent and that said Letters Patent is hereby corrected as shown below:

```
Col. 4, line  9, change "P" to --p--;
        line 10, change "signals" to --signal--;
        line 11, change "P" to --p--.

Col. 5, line 23, delete ",";
        line 54, delete "the";
        line 59, after "change" insert --or issuing the
                 alarm when the difference between the
                 actual elapsed time is greater than the
                 maximum allowable time--.
```

Signed and Sealed this

Second Day of September 1986

[SEAL]

Attest:

DONALD J. QUIGG

*Attesting Officer*   *Commissioner of Patents and Trademarks*